(12) United States Patent
Misita

(10) Patent No.: US 8,752,509 B1
(45) Date of Patent: Jun. 17, 2014

(54) METHOD OF USING AN A-Z LIVESTOCK TRAINING ROPE

(71) Applicant: Anthony Jay Misita, Folsom, LA (US)

(72) Inventor: Anthony Jay Misita, Folsom, LA (US)

(*) Notice: Subject to any disclaimer, the term of this patent is extended or adjusted under 35 U.S.C. 154(b) by 0 days.

(21) Appl. No.: 13/936,236

(22) Filed: Jul. 8, 2013

(51) Int. Cl.
*A01K 27/00* (2006.01)
*A01K 37/00* (2006.01)

(52) U.S. Cl.
USPC .......................................... 119/712; 119/856

(58) Field of Classification Search
USPC ......... 119/774, 784, 856, 712, 769, 792, 793, 119/795, 820; D30/154, 153, 138, 140
See application file for complete search history.

(56) References Cited

U.S. PATENT DOCUMENTS

| | | | | |
|---|---|---|---|---|
| 2,643,638 A * | 6/1953 | Villmer | ......................... | 119/805 |
| 2,821,168 A * | 1/1958 | Forbes | ......................... | 119/795 |
| 5,003,929 A * | 4/1991 | Dean | ............................. | 119/784 |
| 5,517,949 A * | 5/1996 | Harris et al. | .................. | 119/795 |
| 5,755,185 A * | 5/1998 | Gallagher | ...................... | 119/792 |
| 6,925,965 B1 * | 8/2005 | Hurwitz | ........................ | 119/793 |
| 2006/0032463 A1 * | 2/2006 | Pettersson | .................... | 119/856 |
| 2012/0060768 A1 * | 3/2012 | Sandler | ........................ | 119/793 |

* cited by examiner

*Primary Examiner* — Kimberly Berona

(57) ABSTRACT

The A-Z Livestock Training Rope is a humane, effective animal training and handling apparatus which teaches leading, tying, trailer loading, ground manners, cinch and saddle pressure, pressure on reins, stops rearing-up and bucking, and is a safer alternative to standard drag lines. It consists of a rope attached to a ring looped around the animal's barrel then passed through the halter. As the operator applies pressure to the end of the rope, the loop tightens around the barrel which exerts pressure on the animal. When the animal yields to the direction of the operator, the rope slacks and the pressure is relieved. As this action is repeated, the animal will learn to yield without the need for pressure on the rope.

7 Claims, 2 Drawing Sheets

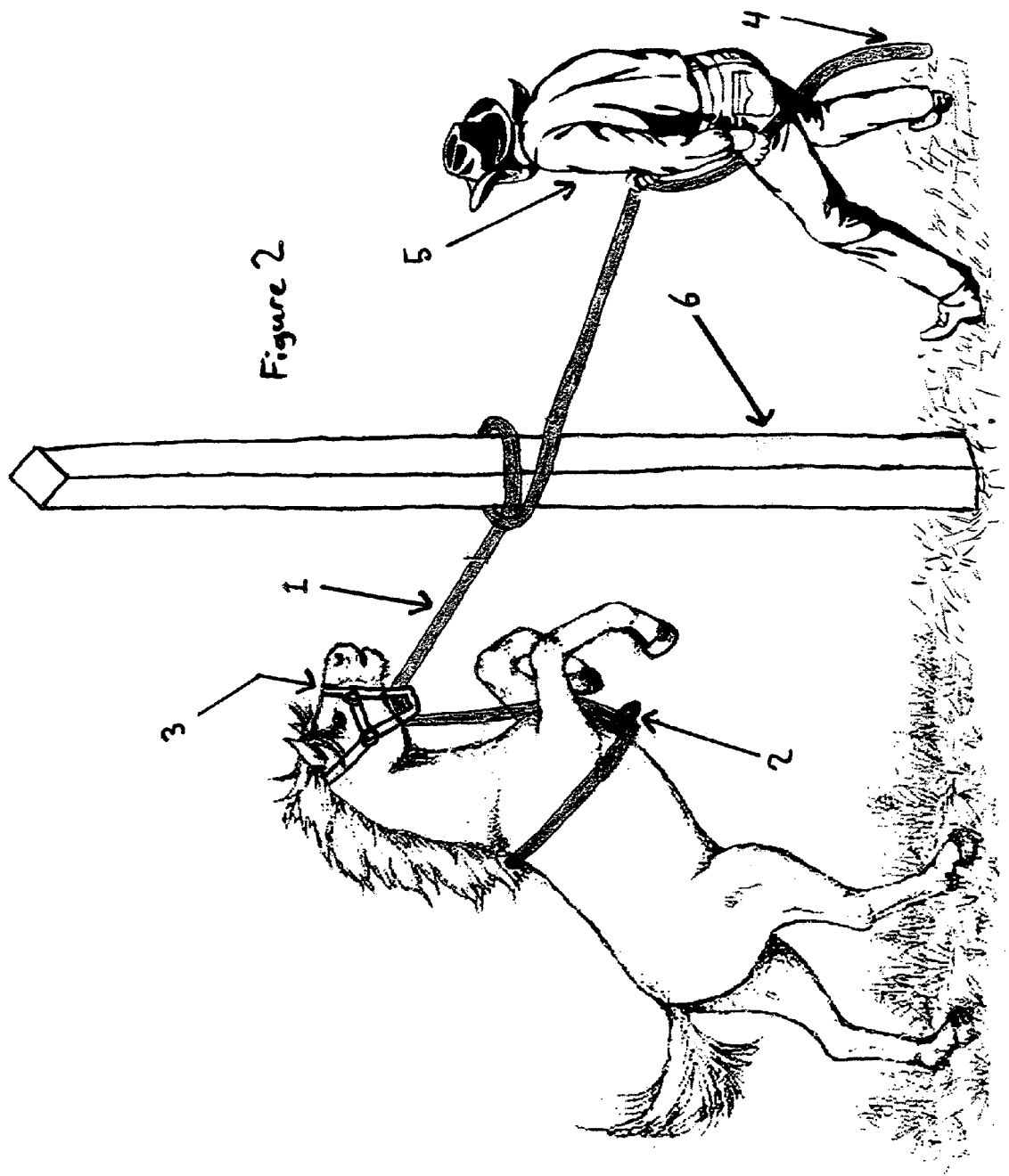

METHOD OF USING AN A-Z LIVESTOCK TRAINING ROPE

CROSS REFERENCE TO RELATED APPLICATIONS

Not Applicable

STATEMENT REGARDING FEDERALLY SPONSORED RESEARCH OR DEVELOPMENT

Not Applicable

REFERENCE TO A SEQUENCE LISTING, A TABLE, OR A COMPUTER PROGRAM, LISTING COMPACT DISC APPENDIX

Not Applicable

BACKGROUND OF THE INVENTION

This training rope is used both in the training and handling of livestock and all other four-legged animals including but not limited to horses, sheep, dogs, cattle, and donkey. It leverages the known training concept that animals learn from the application and release of pressure.

Prior to the inception of this invention, the aforementioned animals were trained and handled using a variety of neck or head mounted apparatus such as halter and lead rope or a lariat. These traditional apparatus are often ineffective given the strength and instincts of these animals to fight against the pressure being presented. These methods can lead to injuries or death including abrasions, strangulation, and broken necks, or at a minimum to further poor behavior.

BRIEF SUMMARY OF THE INVENTION

The object of this training rope is to provide a safe way to handle an animal and to use as a training apparatus by teaching the animal to learn from the application and subsequent release of pressure being exhibited by the training rope around the animal's barrel. This method is safer, humane, and more effective compared to traditional methods.

BRIEF DESCRIPTION OF THE SEVERAL VIEWS OF THE DRAWING

FIG. 2: Depicts the training rope in-use with a horse being taught tying by the operator—(1)-training rope; (2)-ring; (3)-halter: (4)-lead end of rope; (5)-operator, (6)-post

DETAILED DESCRIPTION OF THE INVENTION

Figure 1:
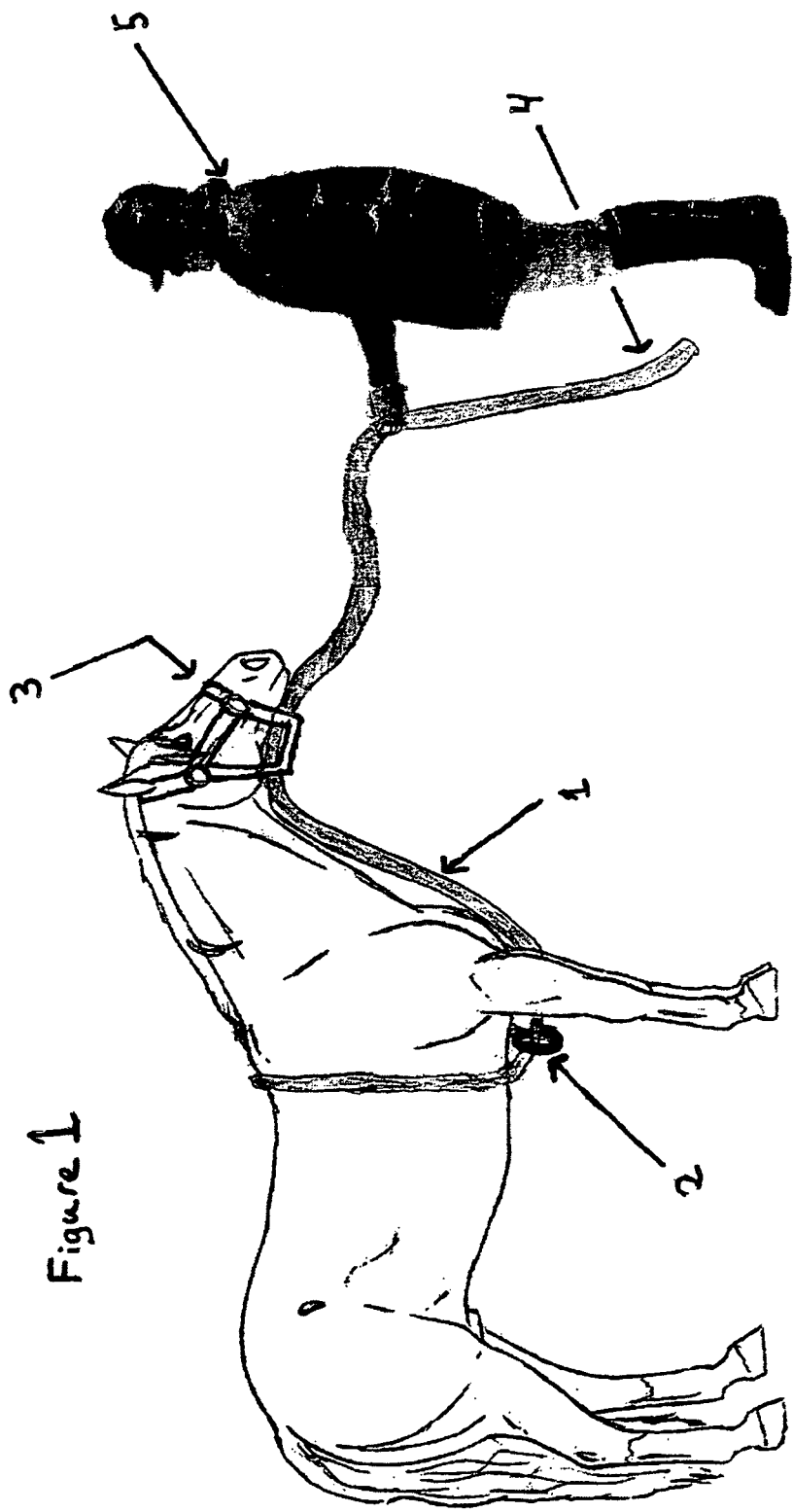
FIG. 1: Depicts the training rope in-use with the operator standing at a safe distance—(1)-training rope; (2)-ring; (3)-halter, (4)-lead end of rope; (5)-operator

The A-Z Training Rope consists of a ring, typically of heavy metal, attached to a rope of sufficient length to be installed on the animal while still providing the operator sufficient length to stand at a safe distance while using the training rope. The training rope will be commercially manufactured in multiple lengths, rope diameters, and ring weights to suit application on different types and sizes of animals and to accommodate a variety of training exercises. It will be apparent that these adjustments can be made to the training rope without departing from the scope of the invention as defined in the claims.

The training rope is installed on the animal by the operator while standing on the side of the animal. The operator passes the ring over the animal's back behind the withers then lowers it to a level below the barrel behind the front legs. The operator grabs hold of the ring bringing it to center between the front legs. The lead (non-ring) end of the rope is fed into the ring, brought between the front legs, and up over both the throat and jaw straps of the animal's halter until slack is removed from the chest area and from around the animal's barrel. Without pressure on the lead end of the rope, the loop should fit loosely around the animal's barrel with the ring hanging several inches below the animal. As tension is applied to the lead end of the rope, the loop around the barrel will tighten and apply pressure to the animal. As the animal yields to the pressure of the barrel loop, the slack gained in the lead will cause the ring weight to drop, thus loosening the barrel loop and removing the pressure from the animal. The animal will learn that by yielding to the pull of the lead, the pressure will be released from their barrel. As this action is repeated, the animal will learn to yield without the need for pressure on the rope.

The A-Z Training Rope teaches leading, tying, trailer loading, manners, cinch and saddle pressure, pressure on reins, stops rearing-up and bucking, and is a safer alternative to standard drag lines. After training with this rope, the animal will yield to the directions of the operator without the need to apply pressure to the rope and barrel, thus allowing for everyday use. Using this training rope, little pressure is applied to the head or neck and is instead centered around the animal's stronger barrel; thus reducing the chance of injury to the animal. The animal learns more quickly to respond to the pressure and release around the barrel than with traditional methods of teaching using halter-lead rope combinations or lariats.

I claim:

1. A method of training a livestock, said method comprising the steps of:
    providing a halter for the livestock located on the head portion of said livestock;
    providing an animal training rope, wherein said training rope consists of a solid ring attached to a first end of a rope and a second end of said rope being free of attachment;
    feeding said first end of rope around the livestock's barrel and inserting said second end through the solid ring to encircle the barrel of the livestock,
    feeding said second end between the front legs of said livestock;
    inserting said second end over each throat and chin strap of said halter;
    applying pressure to the second end of the rope, so that the portion of the rope encircling the livestock's barrel tightens;
    relieving pressure from said second end of the rope, so that the portion of the rope encircling the livestock's barrel loosens;
    repeating said applying and relieving steps so as to train the animal.

2. The method of training livestock of claim 1, wherein said solid ring is of a weight to drop from the livestock's barrel when pressure is removed from the second end of the rope.

3. The method of claim 1, wherein said solid ring is of an inner wall shape and smoothness to allow the rope to pass freely within.

4. The method of claim 1, wherein said rope is of a thickness so as to distribute pressure over a broad area so as to not cut into the livestock's hide when pressure is applied.

5. The method of claim 1, wherein the rope is of a length so as to allow the user to stand a safe distance while the training rope is in use on the livestock.

6. The method of claim 1, wherein the rope is of a strength to permit tying of the second end of the rope without breakage of the rope.

7. The method of claim 1, wherein an exterior surface of the rope is durable and of a non-abrasive texture to prevent chaffing of the livestock's skin.

* * * * *